(12) United States Patent
Nahman et al.

(10) Patent No.: US 10,126,823 B2
(45) Date of Patent: Nov. 13, 2018

(54) IN-VEHICLE GESTURE INTERACTIVE SPATIAL AUDIO SYSTEM

(71) Applicant: HARMAN INTERNATIONAL INDUSTRIES, INC., Stamford, CT (US)

(72) Inventors: Jaime Elliot Nahman, Oakland, CA (US); Davide Di Censo, San Mateo, CA (US); Stefan Marti, Oakland, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 516 days.

(21) Appl. No.: 14/587,602

(22) Filed: Dec. 31, 2014

(65) Prior Publication Data

US 2015/0193197 A1 Jul. 9, 2015

Related U.S. Application Data

(60) Provisional application No. 61/923,571, filed on Jan. 3, 2014, provisional application No. 61/923,560, filed on Jan. 3, 2014.

(51) Int. Cl.
*G06F 3/01* (2006.01)
*G06F 3/0484* (2013.01)
(Continued)

(52) U.S. Cl.
CPC .............. *G06F 3/017* (2013.01); *B60K 37/06* (2013.01); *G06F 3/016* (2013.01); *G06F 3/0304* (2013.01);
(Continued)

(58) Field of Classification Search
CPC .......... G06F 3/017; G06F 3/162; G06F 3/016; G06F 3/165; G06F 3/04842; H04S 7/304;
(Continued)

(56) References Cited

U.S. PATENT DOCUMENTS 5,539,741 A * 7/1996 Barraclough ....... H04L 12/1813
348/14.07
6,230,130 B1 * 5/2001 Castello da Costa ......................
H04N 21/4341
370/267

(Continued)

FOREIGN PATENT DOCUMENTS

JP 05-241573 A 9/1993
JP 09-090963 A 4/1997
(Continued)

OTHER PUBLICATIONS

European Search Report for EP 15 150 026.1, dated Apr. 13, 2015.

*Primary Examiner* — Amy M Levy
(74) *Attorney, Agent, or Firm* — Artegis Law Group, LLP

(57) ABSTRACT

One embodiment of the present invention sets forth a technique for modifying an audio parameter based on a gesture. The technique includes acquiring sensor data associated with a hand of a user and analyzing the sensor data to determine at least one hand position. The technique further includes determining, based on the at least one hand position, an interaction between a first virtual object that corresponds to an audio event and a second virtual object that corresponds to the hand of the user. The technique further includes, based on the interaction, modifying a spatial audio parameter associated with the audio event to generate a modified audio stream and causing the modified audio stream to be reproduced for output to the user.

18 Claims, 10 Drawing Sheets

(51) Int. Cl.
*H04S 3/00* (2006.01)
*G06F 3/03* (2006.01)
*H04S 7/00* (2006.01)
*G06F 3/16* (2006.01)
*B60K 37/06* (2006.01)

(52) U.S. Cl.
CPC .......... *G06F 3/04842* (2013.01); *G06F 3/162* (2013.01); *G06F 3/165* (2013.01); *G06F 3/167* (2013.01); *H04S 7/30* (2013.01); *H04S 7/304* (2013.01); *B60K 2350/1052* (2013.01); *H04R 2499/13* (2013.01); *H04S 2400/11* (2013.01); *H04S 2420/01* (2013.01)

(58) Field of Classification Search
CPC ........ H04S 7/30; H04S 3/008; H04S 2400/11; H04S 2420/01; H04R 2499/13; B60K 37/06
See application file for complete search history.

(56) References Cited

U.S. PATENT DOCUMENTS

| | | | |
|---|---|---|---|
| 6,647,119 | B1 | 11/2003 | Slezak |
| 8,144,633 | B2* | 3/2012 | Yoakum .............. H04L 65/4015 348/14.03 |
| 8,922,590 | B1* | 12/2014 | Luckett, Jr. ............. G09G 5/377 345/633 |
| 9,544,679 | B2* | 1/2017 | Trestain ................. H04R 1/323 |
| 9,620,131 | B2* | 4/2017 | Patel ..................... G10L 19/005 |
| 2002/0175933 | A1 | 11/2002 | Ronkainen et al. |
| 2004/0111171 | A1* | 6/2004 | Jang ........................ H04S 7/30 700/94 |
| 2005/0222844 | A1* | 10/2005 | Kawahara .............. H04S 3/002 704/260 |
| 2005/0264527 | A1* | 12/2005 | Lin ......................... G06F 3/011 345/156 |
| 2008/0084981 | A1* | 4/2008 | Lee ..................... H04M 1/6016 379/201.01 |
| 2009/0278915 | A1* | 11/2009 | Kramer ................... G06F 3/017 348/48 |
| 2010/0194863 | A1* | 8/2010 | Lopes ..................... G06T 19/00 348/50 |
| 2012/0093348 | A1* | 4/2012 | Li ........................... H04S 3/002 381/300 |
| 2012/0210223 | A1* | 8/2012 | Eppolito ................... H04S 7/40 715/716 |
| 2012/0212509 | A1* | 8/2012 | Benko .................... G03B 35/00 345/633 |
| 2012/0242581 | A1* | 9/2012 | Laubach ............. G06F 3/04812 345/168 |
| 2013/0141247 | A1* | 6/2013 | Ricci ........................ G06F 9/54 340/870.01 |
| 2013/0208926 | A1 | 8/2013 | Vincent et al. |
| 2013/0259238 | A1 | 10/2013 | Xiang et al. |
| 2013/0279706 | A1* | 10/2013 | Marti ....................... G06F 3/165 381/57 |
| 2014/0129937 | A1* | 5/2014 | Jarvinen ............... G06F 3/0487 715/716 |
| 2014/0270305 | A1* | 9/2014 | Baym ..................... H04R 1/403 381/334 |
| 2014/0309806 | A1* | 10/2014 | Ricci ........................ B60Q 1/00 701/1 |
| 2015/0033123 | A1* | 1/2015 | Arrasvuori ............. G06F 3/165 715/716 |
| 2015/0040040 | A1* | 2/2015 | Balan .................. G06F 3/04847 715/762 |
| 2015/0309573 | A1* | 10/2015 | Brombach ............. B60K 37/02 715/702 |
| 2016/0004499 | A1* | 1/2016 | Kim .................... G06F 3/04847 715/716 |

FOREIGN PATENT DOCUMENTS

| | | |
|---|---|---|
| JP | 2000-040147 A | 2/2000 |
| JP | 2005-269231 A | 9/2005 |
| JP | 2008-118697 A | 5/2008 |
| JP | 2008-123431 A | 5/2008 |
| JP | 2013-207759 A | 10/2013 |
| WO | 2008/132724 A1 | 11/2008 |

* cited by examiner

IN-VEHICLE GESTURE INTERACTIVE SPATIAL AUDIO SYSTEM

CROSS-REFERENCE TO RELATED APPLICATIONS

This application claims benefit of the U.S. provisional patent application having Ser. No. 61/923,560, filed Jan. 3, 2014, and U.S. provisional patent application having Ser. No. 61/923,571, filed Jan. 3, 2014. The subject matter of these related applications is hereby incorporated herein by reference.

BACKGROUND

Field of the Embodiments of the Invention

Embodiments of the present invention generally relate to audio signal processing and, more specifically, to an in-vehicle gesture interactive spatial audio system.

Description of the Related Art

Use of electronic devices, such as navigation systems, communication devices, and media players, is becoming increasingly popular in all aspects of daily life. Such devices provide users with convenient access to informational content, such as navigational instructions, and media content, such as music, news, and podcasts. Additionally, such devices provide users with access to a wide range of communication services, many of which enable users to interact with one another via audio, video, and/or textual interfaces.

A problem oftentimes encountered by users of electronic devices occurs when an electronic device simultaneously reproduces multiple audio events for the user of that device. For example, a user that is operating multiple software applications on the same device (e.g., multitasking) may have difficulty distinguishing between audio content that is being generated by one software application and audio content that is being generated by another software application. Consequently, in some situations, the user may not know which sounds are associated with which software application and/or the user may be distracted by the simultaneous presentation of multiple audio events, which may inhibit the ability of the user to effectively interact with a particular software application. Additionally, a user that is talking to one or more people via a communication service while also using a separate software application (e.g., a media player) may have difficulty paying attention to the conversation while a separate audio event (e.g., music) is being reproduced.

As the foregoing illustrates, techniques that enable a user to more effectively listen to audio events would be useful.

SUMMARY

One embodiment of the present invention sets forth a method for modifying an audio parameter based on a gesture. The method includes acquiring sensor data associated with a hand of a user and analyzing the sensor data to determine at least one hand position. The method further includes determining, based on the at least one hand position, an interaction between a first virtual object that corresponds to an audio event and a second virtual object that corresponds to the hand of the user. The method further includes, based on the interaction, modifying a spatial audio parameter associated with the audio event to generate a modified audio stream and causing the modified audio stream to be reproduced for output to the user.

Further embodiments provide, among other things, a system and a non-transitory computer-readable medium configured to implement the method set forth above.

At least one advantage of the disclosed technique is that it enables a user to modify the position at which an audio event is being reproduced within a virtual sound space. For instance, a user may interact with a volumetric display to grasp a virtual object associated with the audio event and reposition the virtual object at a desired location within a virtual three-dimensional space. Additionally, visual, auditory, and/or haptic feedback may be provided to the user (e.g., via the volumetric display) when the user interacts with the audio event. Accordingly, audio events may be repositioned within the sound space, enabling the user to more effectively listen to and/or interact with multiple audio events at the same time.

BRIEF DESCRIPTION OF THE SEVERAL VIEWS OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

Figure 1A:
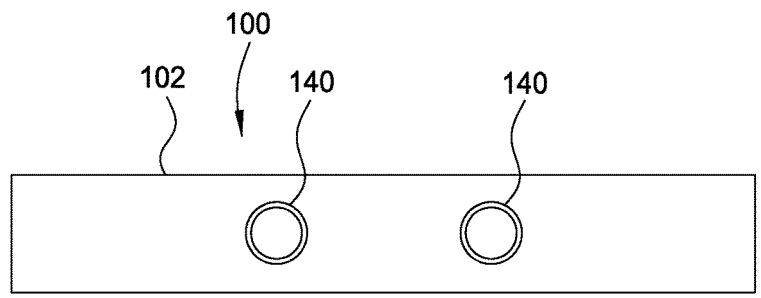
FIG. 1A illustrates a gesture interactive spatial audio system ("gesture system") for recognizing user gestures and modifying spatial audio parameters of an audio stream, according to various embodiments.
Figure 1B:
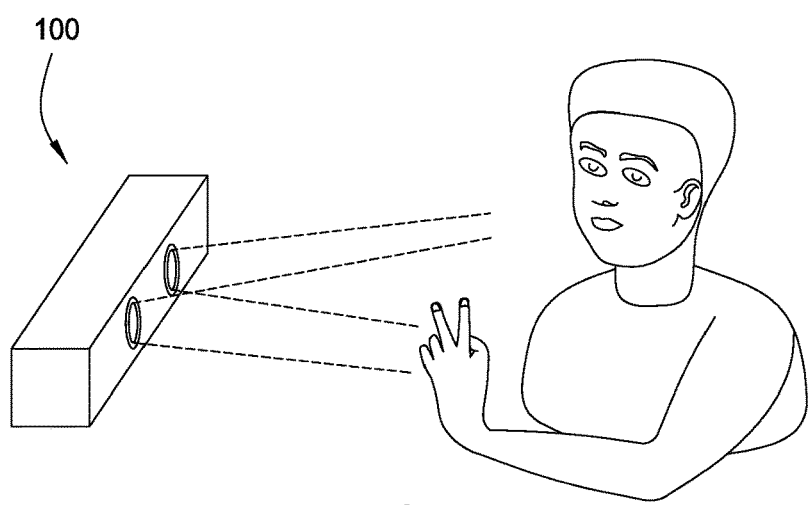
FIG. 1B illustrates a user interacting with the gesture system of FIG. 1A in order modify spatial audio parameters via one or more gestures, according to various embodiments.

FIG. 1A illustrates a gesture interactive spatial audio system 100 ("gesture system 100") for recognizing user gestures and modifying spatial audio parameters of an audio stream, according to various embodiments. The gesture system 100 includes one or more sensors 140. The sensor(s) 140 are configured to acquire data associated with gestures performed by the user and/or to acquire data that enables the gesture system 100 to track the location and/or orientation of the user relative to his or her environment. The sensor(s) 140 may be configured to acquire images of the user's hand(s), arm(s), and/or finger(s), as shown in FIG. 1B, which illustrates a user interacting with the gesture system 100 of FIG. 1A in order modify spatial audio parameters via one or more gestures, according to various embodiments. In some embodiments, the sensor(s) 140 include visual sensors, such as cameras. Additionally, in some embodiments, the sensor(s) 140 include ultrasonic sensors, radar sensors, laser sensors, thermal sensors, and/or depth sensors, such as time-of-flight sensors, structured light sensors, and the like.

In some embodiments, the sensor(s) 140 are configured to detect one or more gestures performed by a user's bare hands and, in response to the gesture(s), modify one or more audio parameters associated with an audio stream. In such embodiments, data acquired by the sensor(s) 140 is analyzed to determine the position(s) of the user's fingertip(s), joint(s), hand(s), wrist(s), and/or arm(s). For example, and without limitation, as shown in FIG. 1B, data acquired by the sensor(s) 140 may be analyzed to determine that the user's fingers are forming a 'V' hand position (e.g., by making the letter V using an index finger and a middle finger or any other finger combination). Then, in response to the 'V' hand position, the gesture system 100 may cause one or more audio events to move (e.g., split) to the sides of a virtual sound space.

Figure 1C:
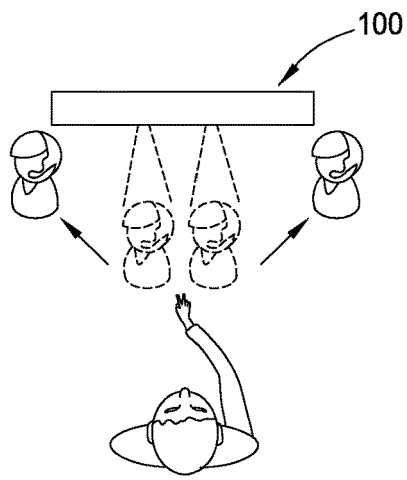
FIG. 1C illustrates spatial audio parameters of audio events being modified by the gesture system of FIG. 1A in response to a splitting gesture, according to various embodiments.

A specific example is shown in FIG. 1C, which illustrates spatial audio parameters of audio events being modified by the gesture system 100 of FIG. 1A in response to a splitting gesture, according to various embodiments. As shown, when a user is speaking to two people via a communication service, the gesture system 100 may detect that a splitting gesture (e.g., based on detecting a 'V' hand position) has been performed and, in response, cause a first audio event associated with a first person's voice to move to one side of the sound space and causes a second audio event associated with a second person's voice to move to the other side of the sound space. Additionally, a splitting gesture may be used to move other types of audio events (e.g., music, podcasts, notifications, etc.) to the sides of the sound space. Further, in some embodiments, other types of gestures may be used to evenly distribute audio events within a sound space, to distribute audio events within a sound space according to a predetermined pattern, to make an audio event play from multiple locations, and/or to mute one or more audio events.

In some embodiments, the sensor(s) 140 are configured to detect one or more gestures performed by the user by tracking the location of an additional device attached to the user. For example, and without limitation, the positions of one or more devices coupled to the user's arm(s) may be tracked to detect a gesture that is being performed by the user. Although two sensors 140 are shown in FIGS. 1A and 1B, any number of sensors 140 located at any position in the gesture system 100 may be used to detect user gestures. In some embodiments, at least two sensors 140 are included in the gesture system 100 to enable a stereo image to be acquired and, thus, to allow the depth of the user's fingers, hands, arms, etc. to be more accurately determined. In other embodiments, gestures are detected using a single sensor that captures images, acquires depth measurements, calculates positions, and the like. Additionally, in various embodiments, sensor(s) 140 may be positioned on objects other than the device body 102 in which the sensor(s) 140 are disposed, such as on an interior and/or exterior surface of a vehicle and/or coupled to a user, such as on a pair of eyeglasses, a watch, a wearable device, the user's body (e.g., the arm-worn Myo™ by Thalmic Labs™), and the like.

Figure 2:
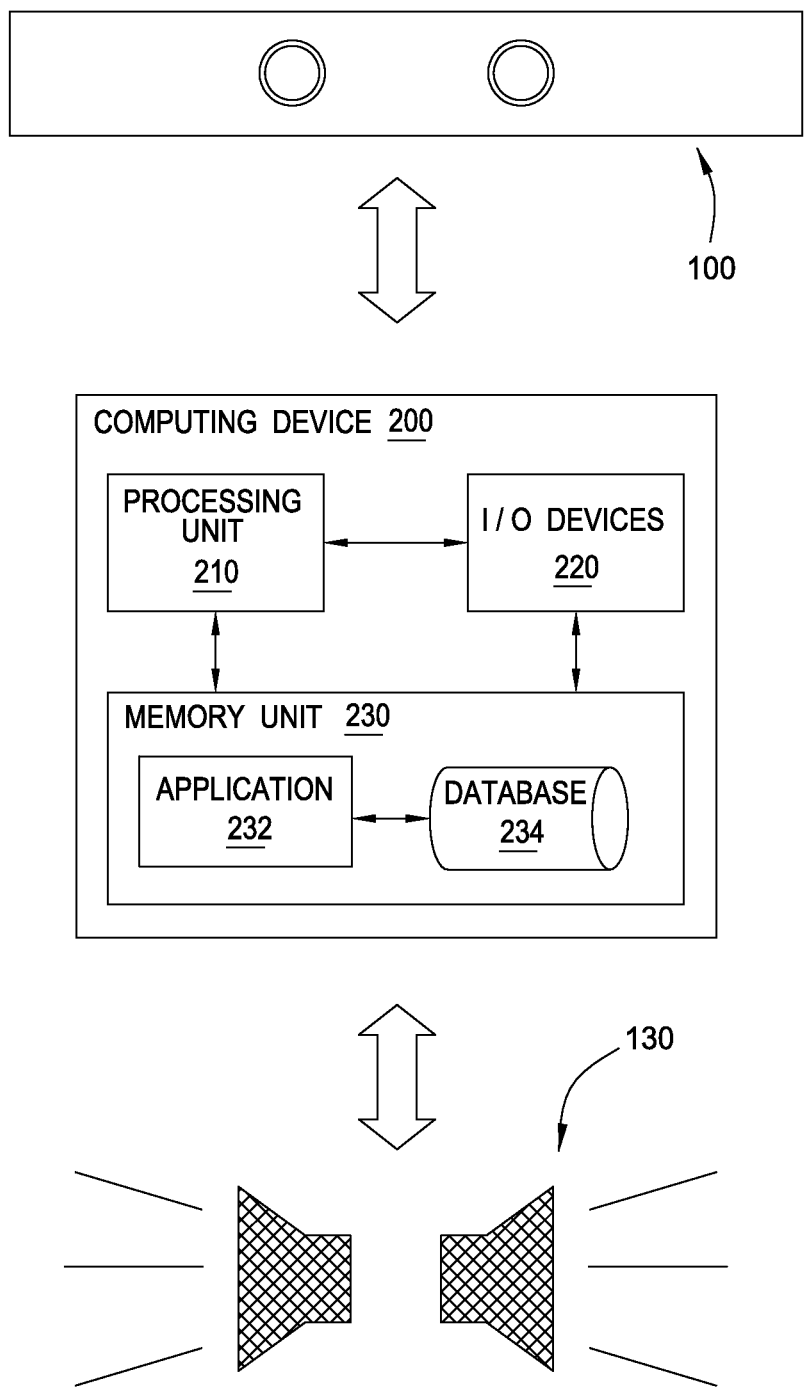
FIG. 2 is a block diagram of a computing device that may be implemented in conjunction with or coupled to the gesture system of FIG. 1A, according to various embodiments.

FIG. 2 is a block diagram of a computing device 200 that may be implemented in conjunction with or coupled to the gesture system 100 of FIG. 1A, according to various embodiments. As shown, computing device 200 includes a processing unit 210, input/output (I/O) devices 220, and a memory device 230. Memory device 230 includes an application 232 configured to interact with a database 234.

The speakers 130 are configured to reproduce an audio stream, such as a multi-channel audio stream, that is outputted by an electronic device integrated with or coupled to the gesture system 100. For example, and without limitation, the speakers 130 may include two or more speakers that are capable of rendering audio events (e.g., voices, notifications, music, navigation directions, etc.) included in an audio stream at specific locations within a sound space. In some embodiments, multiple speakers are distributed within an environment (e.g., a vehicle cabin) in order to render audio events at specific locations in the sound space. In the same or other embodiments, audio signal processing techniques may be used to virtually render audio events at specific locations in the sound space using two or more speakers.

Processing unit 210 may include a central processing unit (CPU), digital signal processing unit (DSP), and so forth. In various embodiments, the processing unit 210 is configured to analyze sensor data acquired by the sensor(s) 140 to detect user gestures and/or determine the location and/or orientation of the user relative to the vehicle environment. Additionally, the processing unit 210 may be configured to modify spatial audio parameters associated with an audio stream that is being outputted to the speakers 130 by the gesture system 100. For example, and without limitation, the processing unit 210 may execute an application 232 that processes one or more audio events included in an audio stream to render the audio events at specific locations in a sound space produced by the speakers 130.

In various embodiments, the processing unit 210 performs analysis on data acquired by the sensor(s) 140 to detect one or more gestures that have been performed by the user. Then, in response to detecting a gesture, the processing unit 210 modifies a spatial audio parameter of an audio stream that is being reproduced by the gesture system 100. For example, and without limitation, the processing unit 210 may modify a spatial audio parameter to modify the perceived location(s) of an audio event within the sound space. In some embodiments, the processing unit 210 modifies a spatial audio parameter of an audio stream based on binaural cues (e.g., interaural time difference, interaural intensity difference), spectral cues, dynamic range cues, head-related transfer functions (e.g., spatial filters that describe how sound waves interact with a listener's body), reverberation, and the like. For example, and without limitation, the processing unit 210 may process an audio stream based on one or more parameters associated with the shape of a user's ear, ear canal, and/or head in order to increase the angular resolution at which audio events are reproduced. In the same or other embodiments, the processing unit 210 modifies a spatial audio parameter of an audio stream by modifying which speakers 130 are reproducing an audio event and/or the level(s) at which an audio event is reproduced by one or more of the speakers 130. For example, and without limitation, the processing unit 210 may modify the perceived location(s) of an audio event within the sound space by increasing and/or decreasing the level(s) at which certain speakers 130 are reproducing the audio event. In some embodiments, audio signal processing is performed by the processing unit 210 via middleware, such as OpenAL.

I/O devices 220 may include input devices, output devices, and devices capable of both receiving input and providing output. For example, and without limitation, I/O devices 220 may include wired and/or wireless communication devices that send data to and/or receive data from the sensor(s) 140 included in the gesture system 100 and/or the speakers 130 coupled to the gesture system 100. Further, in some embodiments, the I/O devices 220 include one or more wired or wireless communication devices that receive audio streams (e.g., via a network, such as a local area network and/or the Internet) that are to be reproduced by the speakers 130. Additionally, as described below in further detail in conjunction with FIGS. 7A and 7B, the I/O devices 220 may include a volumetric display that enables a user to view and modify the position at which an audio event is being reproduced within a sound space.

Memory unit 230 may include a memory module or collection of memory modules. Software application 232 within memory unit 230 may be executed by processing unit 210 to implement the overall functionality of the computing device 200, and, thus, to coordinate the operation of the gesture system 100 as a whole. The database 234 may store digital signal processing algorithms, audio streams, gesture recognition data, volumetric display data, and the like.

Computing device 200 as a whole may be a microprocessor, an application-specific integrated circuit (ASIC), a system-on-a-chip (SoC), a mobile computing device such as a tablet computer or cell phone, a media player, and so forth. Generally, computing device 200 may be configured to coordinate the overall operation of the gesture system 100. In other embodiments, the computing device 200 may be coupled to, but separate from the gesture system 100. In such embodiments, the gesture system 100 may include a separate processor that receives data (e.g., audio streams) from and transmits data (e.g., sensor data) to the computing device 200, which may be included in a consumer electronic device, such as a vehicle head unit, navigation system, smartphone, portable media player, personal computer, and the like. However, the embodiments disclosed herein contemplate any technically feasible system configured to implement the functionality of the gesture system 100.

Figure 3:
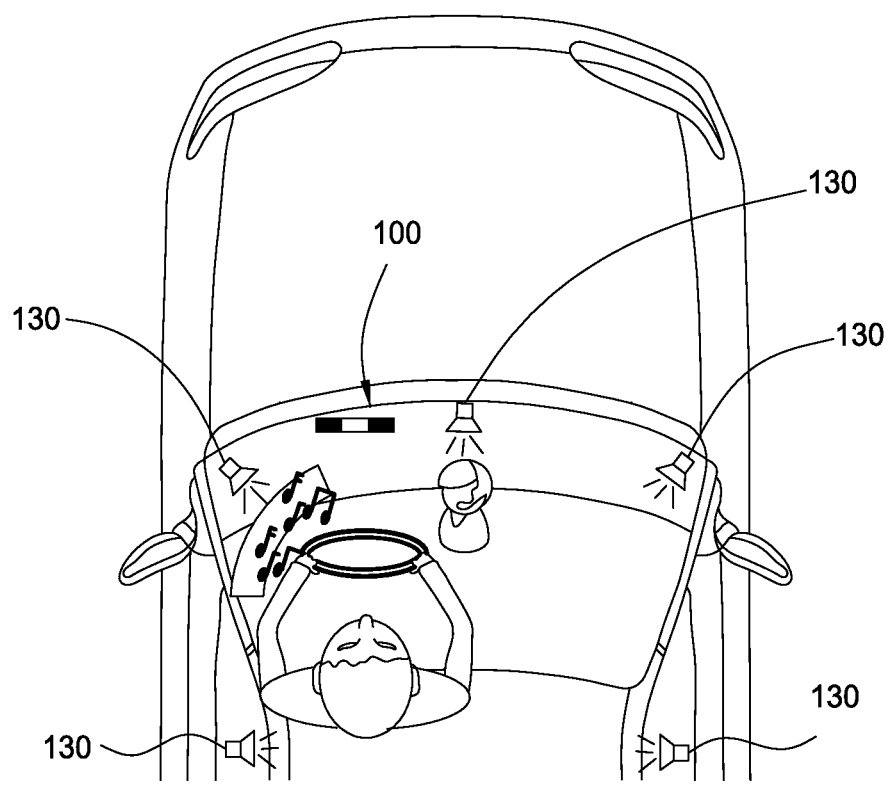
FIG. 3 illustrates a user interacting with the gesture system of FIG. 1A in an automotive environment, according to various embodiments.

FIG. 3 illustrates a user interacting with the gesture system 100 of FIG. 1A in an automotive environment, according to various embodiments. As described above, audio events included in an audio stream may be processed (e.g., via processing unit 210) to render the audio events at specific locations in a sound space produced by the speakers 130. For example, and without limitation, as shown, the processing unit 210 may modify spatial audio parameters associated with an ambient audio source (e.g., music) and a point audio source (e.g., a voice call) in order to render the ambient audio source on the left side of the sound space and the point audio source on the right side of the sound space. Although five speakers 130 are shown in FIG. 3, in other embodiments, two or more speakers 130 may be used to produce a two-dimensional or three-dimensional sound space in the listening environment.

Figure 4C:
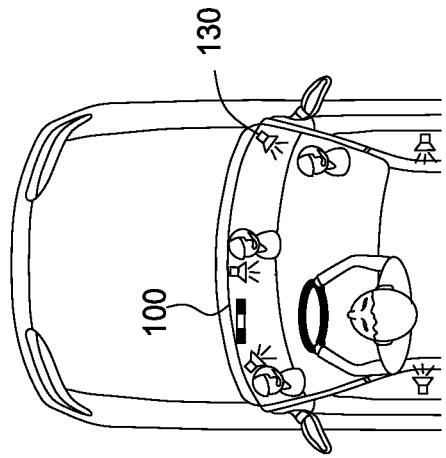
FIGS. 4A-4C illustrate a user interacting with the gesture system of FIG. 1A to reposition audio events generated by a communication service, according to various embodiments.
Figure 4B:
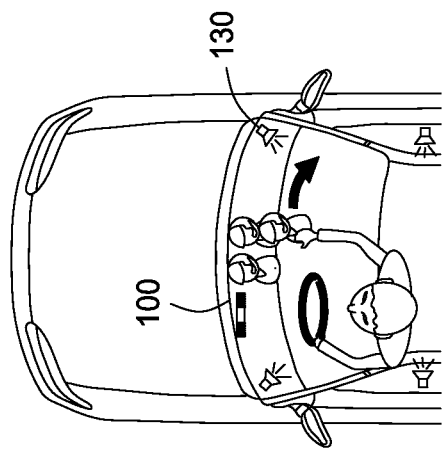

As described above, the gesture system 100 detects a gesture performed by the user and, in response, modifies one or more parameters of an audio stream being reproduced by the speakers 130. In some embodiments, a user performs one or more gestures to selectively reposition the voices of one or more people within a sound space. As specific example is shown in FIGS. 4A-4C, which illustrate a user interacting with the gesture system 100 of FIG. 1A to reposition audio events generated by a communication service, according to various embodiments.

Figure 4A:
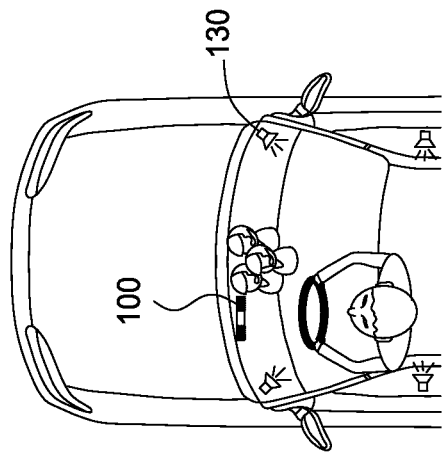

As shown in FIG. 4A, initially (e.g., when a voice call is initiated), the voices of the people with which the user is speaking may be rendered from similar or identical positions within the sound space. Then, the user may move his or her hand to the locations associated with the voices and interact with a virtual object that corresponds to each voice to cause the voice to be repositioned within the sound space. For example, and without limitation, as shown in FIGS. 4B and 4C, the user can reposition an audio event by moving his or her hand to the left or right and/or up, down, forward, or backward (e.g., within a two-dimensional X, Y plane or within a three-dimensional X, Y, Z space) within the sound space to interact with virtual objects. The hand gesture(s) and the new position(s) of the virtual objects are then determined via data acquired by the sensor(s) 140 and passed to the processing unit 210. In response, the processing unit 210 modifies one or more parameters associated with the audio event(s) such that the user perceives the voices as being located at the new position(s) (e.g., as multiple, distinct point audio sources). Accordingly, the gesture system 100 may accurately simulate a live conversation, where multiple people are located at different positions relative to the user, thereby enabling the user to more easily distinguish between the multiple voices.

The processing unit 210 is configured to determine whether a user is attempting to reposition an audio event using a variety of techniques. In one technique, the processing unit 210 tracks the location (e.g., coordinates within a three-dimensional space) of a first virtual object that is associated with an audio event and determines (e.g., via the sensor(s) 140) when a second virtual object associated with the fingers, hand, and/or arm of the user is interacting with (e.g., grasping) the first virtual object. The processing unit 210 then implements a physics model to determine the new position of the first virtual object based on the interaction with the second virtual object. For example, and without limitation, in some embodiments, the processing unit 210 detects the position of the user's hand to determine when a user has grasped, pushed, pulled, swiped, etc. a virtual object that is associated with an audio event. The processing unit 210 then implements a physics model to determine (e.g., based on a velocity, distance, and/or duration of the grasp, push, pull, and/or swipe) the new position of the audio event. One or more parameters of the audio stream may then be modified such that the user perceives the audio event as being located at the new position.

In some embodiments, the user moves his or her hand to a location associated with the perceived position of the audio event (e.g., the point audio source) within the sound space and performs a grasping gesture to grasp a virtual object that corresponds to the audio event. Then, while the user is performing the grasping gesture, the user moves the audio event to the desired location (e.g., as shown in FIGS. 4B and 4C). In response, the processing unit 210 modifies one or more parameters (e.g., spatial audio parameters) associated with the audio stream such that the user perceives the audio event as being rendered from the desired angle and/or distance relative to the user.

Additionally, a user may use other types of gestures, such as a swipe gesture, to reposition an audio event, as shown in FIGS. 5A-5E, which illustrate a user interacting with a virtual object to reposition an audio event, according to various embodiments. For clarity of explanation, FIGS. 5A-5E include visual representations of virtual objects associated with certain audio events (e.g., ambient music and a voice call). However, in some embodiments, these visual representations are not visible to the user of the gesture system 100.

Figure 5A:
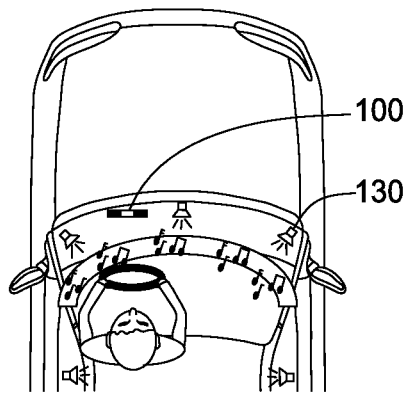
FIGS. 5A-5E illustrate a user interacting with a virtual object to reposition an audio event, according to various embodiments.
Figure 5B:
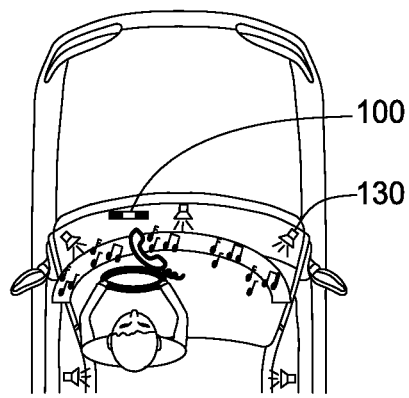
Figure 5C:
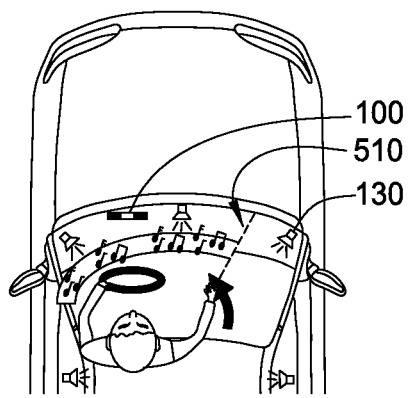
Figure 5D:
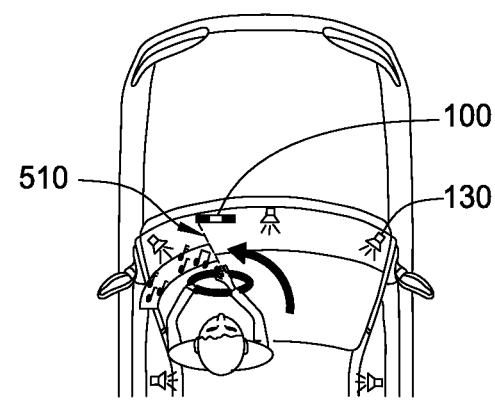
Figure 5E:
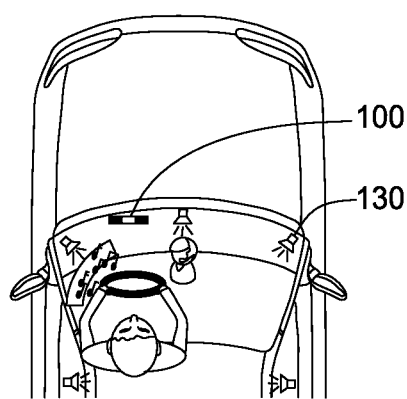

As shown in FIGS. 5A and 5B, while a user is listening to an ambient audio source (e.g., music which is rendered all around the user using two or more speakers 130) being generated by a media player, the user may receive notification of an incoming call from a communication service. The user may then choose to swipe a virtual object associated with the music to the left side of the sound space, as shown in FIGS. 5C and 5D. In response, the processing unit 210 tracks the location of the user's hand and optionally implements a physics model to determine the new position of the virtual object associated with the music based on the velocity, distance, and/or duration of the swipe gesture. In some embodiments, the processing unit 210 analyzes data received from the sensor(s) 140 to determine where the swipe gesture was initiated and/or where the gesture ended. The processing unit 210 then modifies one or more parameters (e.g., sound balance and/or direction) of the ambient audio source based on the new location of the virtual object to causing the portion of the sound space spanned by the audio event to be resized. Accordingly, as shown in FIG. 5E, a point audio source, such as an incoming call, may be placed on the right side of the sound space while an ambient audio source, such as music, continues to play from the left side of the sound space. Consequently, the music does not substantially interfere with the incoming call, enabling the user to more effectively listen to and/or interact with multiple audio events at the same time.

As described above, the position(s) of one or more audio events within a sound space can be modified based on a single hand position (e.g., a static gesture), without requiring the user to use his or her arms to grasp, push, pull, swipe, etc. individual audio events. In such embodiments, the orientations of one or more fingers associated with a stationary hand position may indicate to the gesture system 100 how the location(s) of one or more audio events within the sound space are to be modified. For example, and without limitation, the user may use the 'V' hand position (e.g., splitting gesture) described above to cause one or more audio events to move split to the sides of the sound space.

In various embodiments, in order to enable a user to reposition audio events associated with virtual objects that are beyond the reach of the user, the effect of a gesture may extend in one or more directions in which the gesture is performed. For example, and without limitation, when a user performs a swipe gesture to reposition an audio event that is outside of the reach of the user, a hand vector 510 may be determined by the gesture system 100. In some embodiments, the hand vector 510 extends in the direction of a finger, hand, and/or arm of the user in order to enable the user to reposition an audio event that is outside his or her reach.

Interactions between the hand vector 510 and one or more audio events (e.g., virtual objects) disposed within the sound space are determined by the processing unit 210, for example and without limitation, based a physics model and/or any of the techniques described herein. The processing unit 210 then modifies one or more parameters of the audio events based on the interaction between the hand vector 510 and the one or more audio events. For example, and without limitation, when the user performs a swipe gesture, the processing unit 210 may generate a hand vector 510 that includes a one-dimensional line or a two-dimensional plane extending from the hand of the user. Then, as the user performs the swipe gesture, the processing unit 210 may update the position of the line or plane based on the changing position of the hand. Interactions (e.g., intersections, collisions) between the line or plane and one or more audio events included in the sound space may then be determined in order to determine the new position(s) of the audio event(s). For example, and without limitation, the processing unit 210 may determine that a plane associated with the hand of the user was moved across the sound space, causing an audio event to be swept from one side of the sound space to the other side of the sound space, as shown in FIGS. 5C and 5D. Further, although the examples provided are described with reference to a swipe gesture and an ambient audio source (e.g., music), a hand vector 510 may be used to perform any other type of gesture (e.g., a grasp, push, or pull gesture) to enable a user to interact with any type of audio event (e.g., ambient audio source, point audio source, etc.) that is out of his or her reach.

In some embodiments, the processing unit 210 implements one or more algorithms to identify individual audio events prior to repositioning the audio events within a sound space. For example, and without limitation, the processing unit 210 may use an algorithm to identify two or more voices received via a communication service. Then, once characteristics associated with each voice (e.g., base pitch, frequency spectrum, cadence, intonation, etc.) have been identified, the spatial audio parameters associated with each voice may be modified to reposition the voices in the sound space. Similar techniques may be used to identify other types of audio events (e.g., music, notifications, etc.) and reposition the audio events within the sound space. Thus, individual audio events may be isolated and repositioned within the sound space even when the audio events have been merged into a single audio channel prior to being received and processed by the processing unit 210.

As described above, in some embodiments, the sensor(s) 140 are configured to track the location and/or orientation of the user within his or her environment. In such embodiments, the location and/or orientation of the user may be used by the gesture system 100 to maintain the positions of audio events relative to the user's environment. For example, and without limitation, when the user turns his or her head towards an audio event that is initially located on one side of the sound space, the gesture system 100 may track the change in orientation of the user's head relative to the environment and, in response, modify the spatial audio parameters associated with the audio event so that the audio event is repositioned in front of the user. Thus, audio events are reproduced for the user at relatively static angular positions and/or distances relative to the user's environment. In addition, when the user changes his or her location within the surrounding environment, the gesture system 100 may modify the loudness of specific audio events based on whether the user is moving towards (e.g., louder) or away from (e.g., quieter) objects within the user's environment.

Figure 6A:
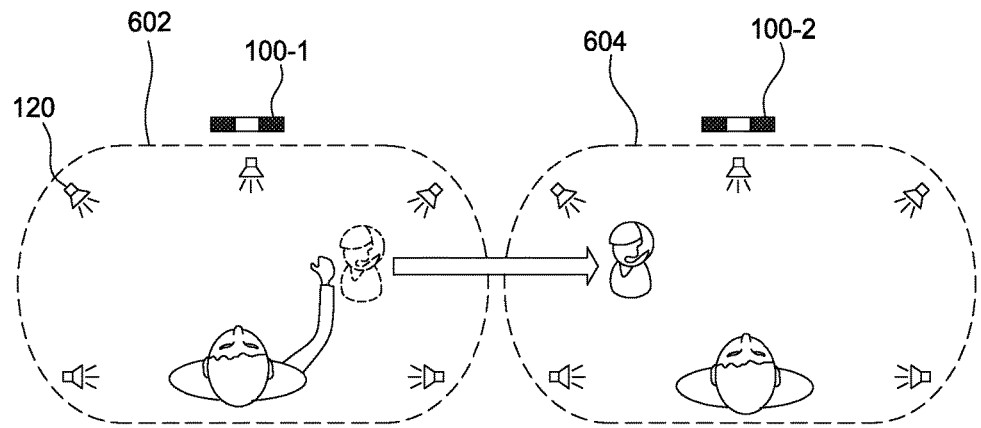
FIG. 6A illustrates two users interacting with separate gesture systems to pass audio events between two different sound spaces, according to various embodiments.

FIG. 6A illustrates two users interacting with separate gesture systems 100 to pass audio events between two different sound spaces, according to various embodiments. In various embodiments, one or more gesture systems 100 may be configured to generate sound events within multiple sound spaces and/or track gestures performed by one or more users within multiple sound spaces. For example, and without limitation, as shown, a gesture system 100 could generate a first sound space 602 for a first user (or set of users), a second sound space 604 for a second user, a third sound space for a third user, and so on. In some embodiments, sound space 602, sound space 604, etc. may include a different set of speakers 120, sensor(s) 140, processing unit 210, etc., so that each user (or set of users) located within a sound space hears substantially only the sound event(s) associated with that sound space. For example, and without limitation, sound space 602 may be implemented via gesture system 100-1 and sound space 604 may be implemented via gesture system 100-2. Further, gesture system 100-1 and gesture system 100-2 may optionally communicate with one another and/or with one or more other gesture system(s) 100 that implement other sound space(s).

Figure 6B:
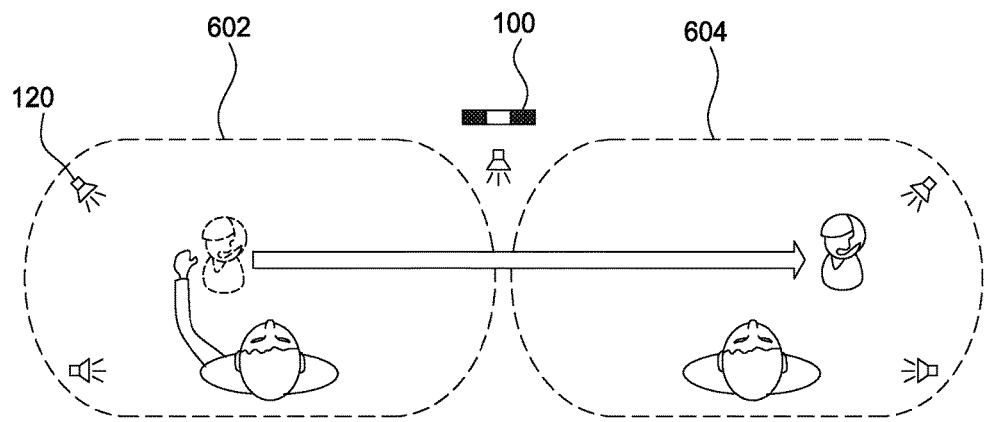
FIG. 6B illustrates two users interacting with a single gesture system to pass audio events between two different sound spaces, according to various embodiments.

In some embodiments, one or more components may be shared between multiple sound spaces and/or in communication with components included in one or more other sound spaces, as shown in FIG. 6B, which illustrates two users interacting with a single gesture system 100 to pass audio events between two different sound spaces, according to various embodiments. Sharing components between multiple sound spaces (e.g., as shown in FIG. 6B) and/or enabling communication between components associated with different sound spaces (e.g., as shown in FIG. 6A) enables gestures to be performed across the sound spaces and/or enables audio events to be passed between the sound spaces. For example, and without limitation, a single computing device 200 that includes one or more processing units 210 may implement sound space 602 and sound space 604 (e.g., by tracking gestures, modifying audio parameters, updating display(s), etc.). Additionally, sound space 602 and sound space 604 may use common sensor(s) 140 and/or speaker(s) 120. For example, and without limitation, a sensor 140 could be used to track gestures associated with both sound space 602 and sound space 604. Additionally, a shared sensor 140 could be used to track a gesture that is associated with two or more sound spaces, such as when a user performs a gesture to pass an audio event (e.g., the voice call shown in FIGS. 6A and 6B) from a first sound space into a second sound space. In some embodiments, sound space 602 may be associated with a first user, such as a driver of a vehicle, and sound space 604 may be associated with a second user, such as a passenger in the vehicle.

As shown in FIGS. 6A and 6B, an audio event, such as a point audio source (e.g., a voice call) or an ambient audio source (e.g., music), may initially be generated within sound space 602 associated with a first user (or set of users). Then, the first user may perform a gesture (e.g., a grasping gesture, swiping gesture, static gesture, etc.) to pass the audio event from sound space 602 to sound space 604, which is associated with a second user (or set of users). In addition, a user may perform a gesture to share an audio event—currently being generated within a first sound space (e.g., sound space 602)—with one or more users located within a second sound space (e.g., sound space 604), causing the audio event to be generated within both sound spaces. As described above, each sound space 602, 604 may include a different set of speakers 120 (and, optionally, one or more shared speakers), such that a user located within a particular sound space hears audio events generated within his or her sound space, but does not substantially hear audio events generated within other sound spaces. Accordingly, by enabling audio events to be passed and/or shared between different sound spaces, each user may customize his or her listening experience without being significantly disturbed by audio events being generated in nearby sound spaces.

Once the user's fingers, hand, arm, etc. is/are proximate to the current location of an audio event (e.g., a virtual object associated with the audio event), the gesture system 100 may produce auditory and/or haptic feedback, such as an audio notification, vibration, ultrasound, air pressure, etc., via one or more feedback devices. Producing auditory and/or haptic feedback enables the user to more easily interact with and reposition audio events. In the same or other embodiments, the gesture system 100 may provide the user with auditory and/or haptic feedback when a gesture is initiated and/or when a gesture is completed, such as once a user releases a virtual object. Additionally, visual feedback may be provided to the user to enable the user to more easily interact with audio events and/or view how his or her gestures are affecting an audio event included within the sound space. Such techniques are described in further detail below in conjunction with FIGS. 7A-8E.

Figure 7B:
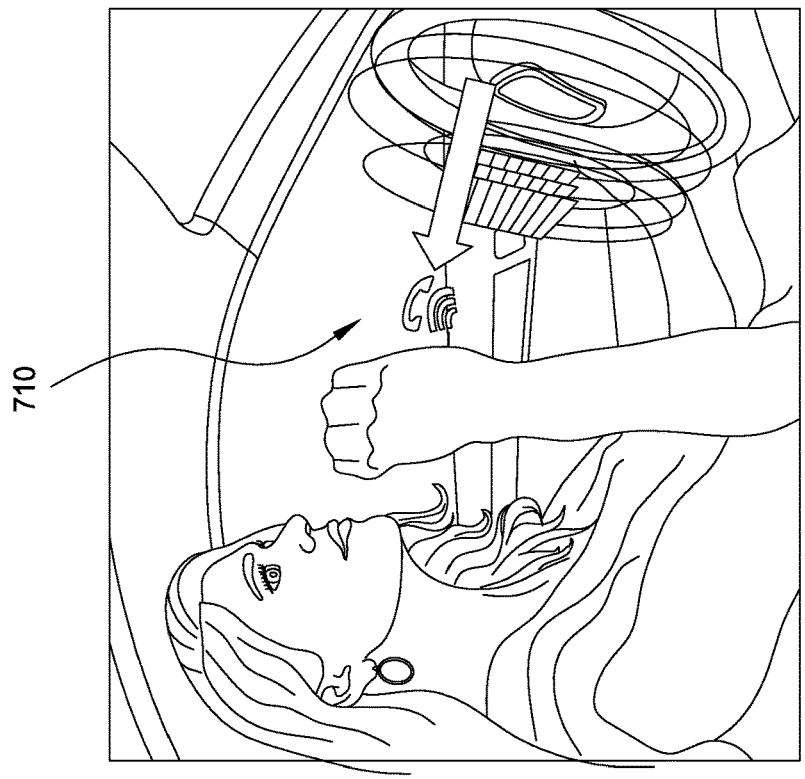
FIGS. 7A and 7B illustrate a volumetric display that may be implemented in conjunction with the gesture system of FIG. 1A, according to various embodiments.
Figure 7A:

FIGS. 7A and 7B illustrate a volumetric display that may be implemented in conjunction with the gesture system 100 of FIG. 1A. As shown, in some embodiments, the gesture system 100 includes a volumetric display 710 that generates visual feedback for the user. In various embodiments, the volumetric display 710 may implement electroholography and/or similar display techniques to display visual representations (e.g., three-dimensional images) of virtual objects that correspond to one or more audio events being reproduced by the speakers 130. Although the volumetric display 710 shown in FIGS. 7A-8E is shown as being implemented in an automotive environment, similar types of displays may be implemented in any other type of listening environment, such as in a home, office, mobile setting, and the like.

In operation, the volumetric display 710 displays one or more visual representations that correspond to audio events included within the sound space produced by the speakers 130. Accordingly, the user can view the position(s) of the audio event(s) and more effectively interact with the audio event(s) via one or more gestures, which are then detected by the sensor(s) 140 coupled to the gesture system 100. For example, and without limitation, the volumetric display 710 may display an ambient audio source (e.g., music) and a point audio source (e.g., a voice call), as shown in FIGS. 8A-8E, which illustrate a user interacting with a volumetric display 710 to reposition an audio event, according to various embodiments. In some embodiments, when an audio event is an ambient audio source that spans a portion of the sound space, the visual representation spans a corresponding portion of the volumetric display 710. In the same or other embodiments, when an audio event is a point audio source that is being rendered at a particular location within the sound space, the visual representation is located at a display position on the volumetric display 710 that corresponds to the location within the sound space. Consequently, visual representations of audio events may substantially reflect or match the location(s) of the audio events within the sound space.

Figure 8A:
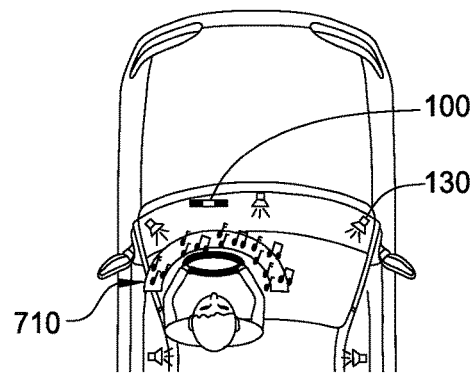
FIGS. 8A-8E illustrate a user interacting with a volumetric display to reposition an audio event, according to various embodiments.
Figure 8B:
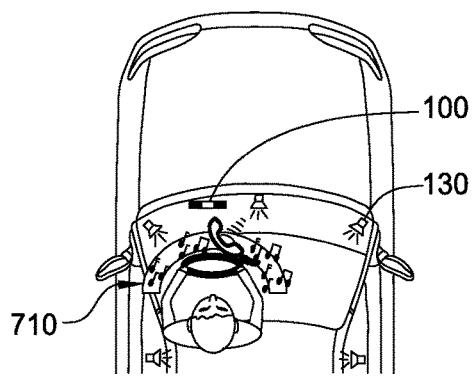
Figure 8C:
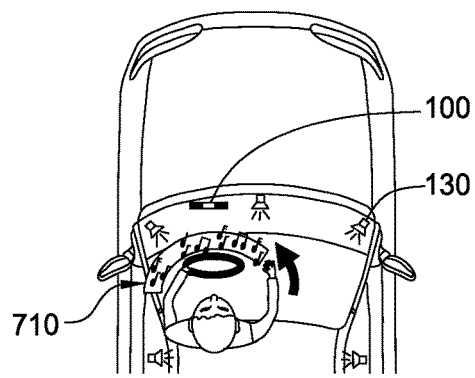
Figure 8D:
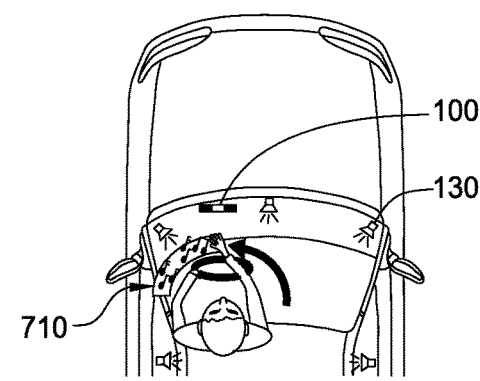
Figure 8E:
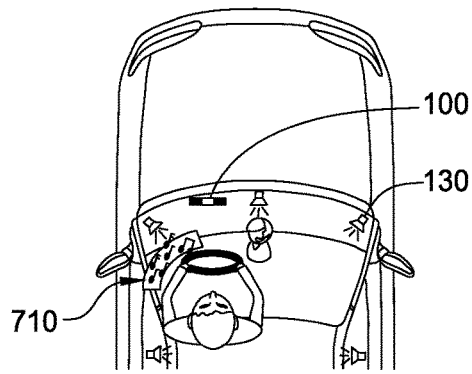

As shown in FIGS. 8A and 8B, while a user is listening to the ambient music source, the user may receive notification of an incoming voice call. The user may then place his or her hand at a desired position relative to one or more audio events being displayed by the volumetric display 710 and perform a gesture, such as a swipe gesture. As the user performs the gesture, the sensor(s) 140 track the location of the hand of the user and update the location(s) of the audio event(s). Additionally, the location(s) of the visual representations of the audio event(s) in the volumetric display 710 are updated to reflect the interactions between the hand of the user and a virtual object associated with the audio event, as shown in FIGS. 8C and 8D. Then, as shown in FIG. 8E, the user may answer a voice call, which may be displayed as a point audio source to the right of the user on the volumetric display 710. Consequently, the user is able to receive visual feedback that reflects his or her interactions with the audio event(s), enabling the user to more effectively reposition audio events within the sound space.

In various embodiments, the user interacts with the volumetric display 710 using one or more of the techniques described above. For example, and without limitation, the processing unit 210 may track the location of a first virtual object that is associated with an audio event and determine (e.g., via the sensor(s) 140) when a second virtual object associated with the fingers, hand, and/or arm of the user is interacting with (e.g., grasping) the first virtual object. In the same or other embodiments, the gesture system 100 may determine an interaction between the user and an audio event by detecting when the user's fingers, hand, arms, etc. are proximate to or intersecting an image generated by the volumetric display 710. In some embodiments, interaction between the user and an image generated by the volumetric display 710 is detected via the sensor(s) 140. For example, and without limitation, one or more sensors 140 may detect that the user's hand is performing a gesture proximate to (or while intersecting) a three-dimensional image produced by the volumetric display 710. The processing unit 210 may then modify one or more audio parameters and/or display positions associated with the audio event(s) that correspond to the three-dimensional image.

Although the examples provided above describe the volumetric display 710 as being used to provide visual feedback for interacting with certain types of audio events via a swipe gesture, the volumetric display 710 may be used to provide visual feedback for any of the gestures, interaction techniques, and/or audio events described above. For example, and without limitation, the volumetric display 710 may provide feedback by displaying one or more audio events (e.g., point audio sources) that the user is grasping and moving within the sound space, such as the point audio sources shown in FIGS. 4A-4C. In addition, the volumetric display 710 may be used to provide visual feedback for actions that are initiated via a single hand position (e.g., a static gesture), without requiring the user to use his or her arms to grasp, push, pull, swipe, etc. individual audio events. Further, the volumetric display 710 may provide visual feedback in conjunction with other types of feedback (e.g., haptic, auditory, etc.) provided by the gesture system 100.

Figure 9:
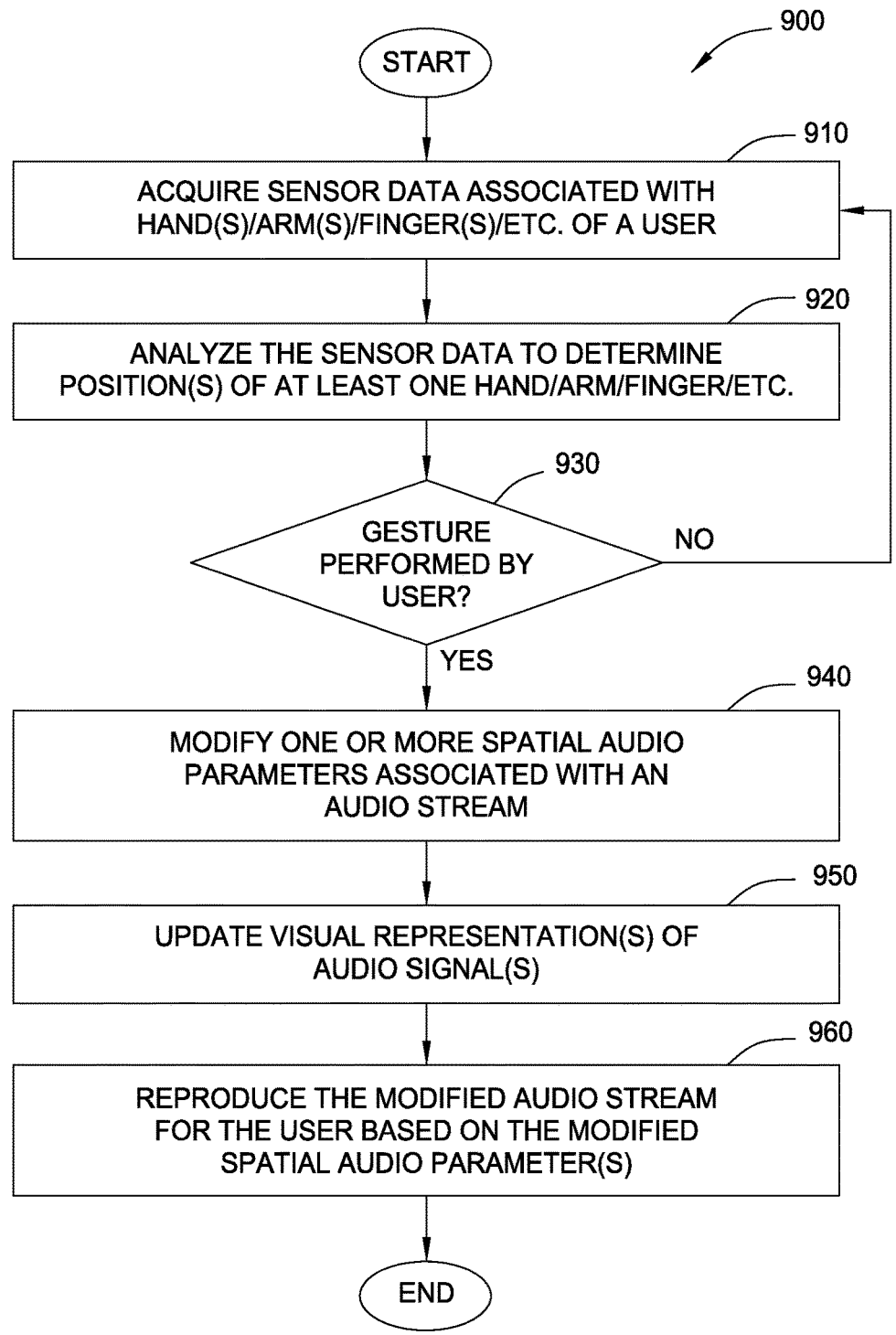
FIG. 9 is a flow diagram of method steps for modifying an audio parameter based on a gesture, according to various embodiments.

FIG. 9 is a flow diagram of method steps for modifying an audio parameter based on a gesture, according to various embodiments. Although the method steps are described in conjunction with the systems of FIGS. 1A-8B persons skilled in the art will understand that any system configured to perform the method steps, in any order, falls within the scope of the present invention.

As shown, a method 900 begins at step 910, where an application 232 executing on the processing unit 210 acquires sensor data associated with the user (e.g., the user's hands, arms, fingers, etc.) via the sensor(s) 140. At step 920, the application 232 analyzes the sensor data to determine one or more hand positions based on the location(s) and/or orientation(s) of the user's hand(s), finger(s), arm(s), etc. Then, at step 930, the application 232 determines whether a gesture (e.g., a splitting gesture) has been performed based on the one or more hand positions. If a gesture has not been performed by the user, then the method 900 returns to step 910, where the application 232 continues to acquire sensor data.

If a gesture has been performed by the user, then the method 900 proceeds to step 940, where the application 232 modifies one or more parameters associated with an audio stream. For example, and without limitation, if the gesture is a splitting gesture, then the application 232 may modify one or more spatial audio parameters associated with the audio stream to cause one or more audio events to be moved to the sides of the sound space. Then, at step 950, the application 232 updates visual representations of the audio event(s) being displayed on an optional display. For example, and without limitation, the application 232 may cause the positions of one or more three-dimensional images generated via a volumetric display 710 to be modified. Next, at step 960, the application 232 causes the modified audio stream to be reproduced for the user via the speakers 130 based on the modified spatial audio parameters. The method 900 then ends.

Figure 10:
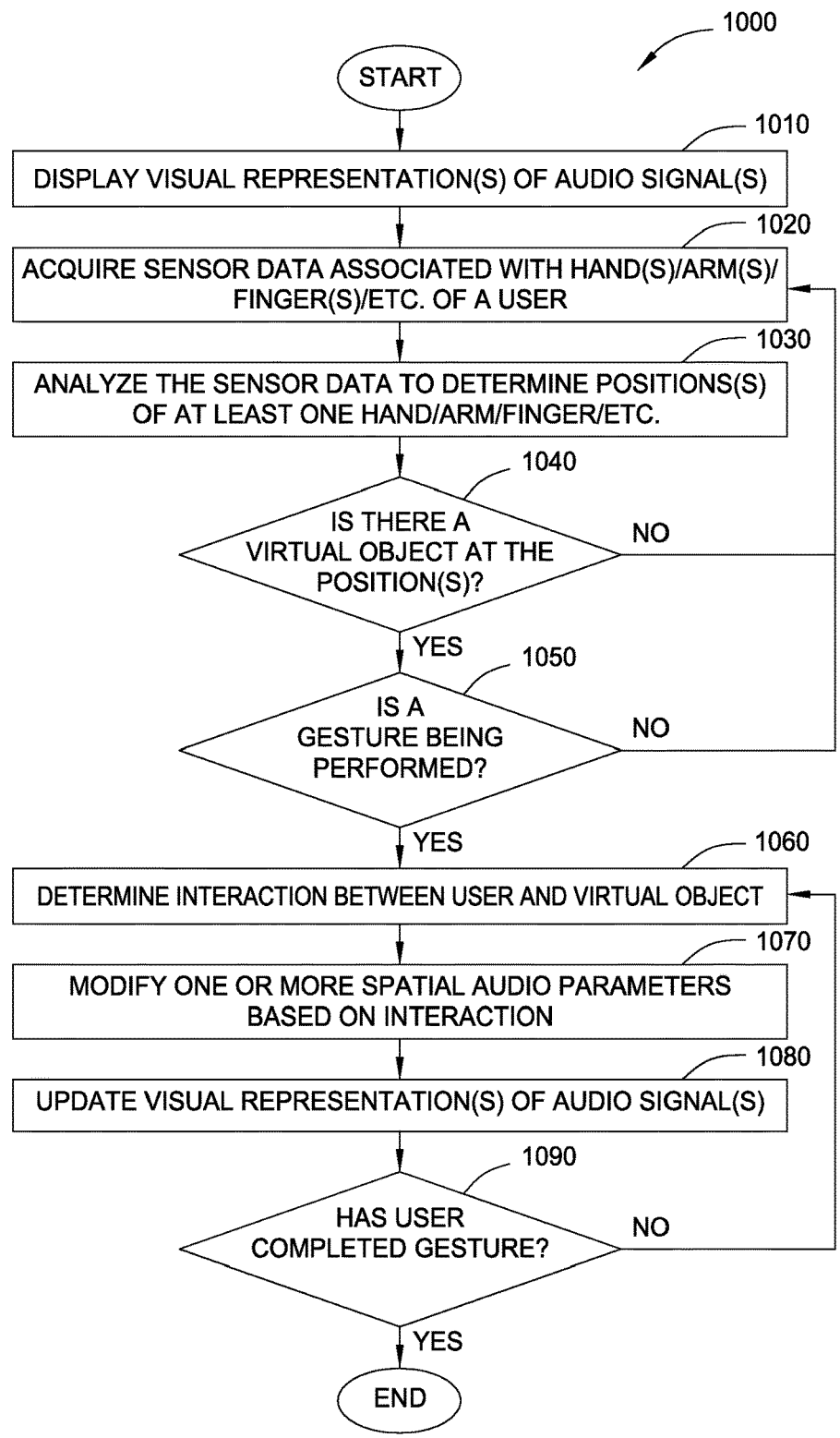
FIG. 10 is a flow diagram of method steps for modifying an audio parameter based on the positioning of a virtual object, according to various embodiments.

FIG. 10 is a flow diagram of method steps for modifying an audio parameter based on the positioning of a virtual object, according to various embodiments. Although the method steps are described in conjunction with the systems of FIGS. 1A-8B, persons skilled in the art will understand that any system configured to perform the method steps, in any order, falls within the scope of the present invention.

As shown, a method 1000 begins at step 1010, where the display (e.g., a volumetric display 710) displays visual representations of one or more audio events included in an audio stream. Then, at step 1020, an application 232 executing on the processing unit 210 acquires sensor data associated with the user (e.g., the user's hands, arms, fingers, etc.) via the sensor(s) 140. At step 1030, the application 232 analyzes the sensor data to determine one or more hand positions based on the location(s) and/or orientation(s) of the user's hand(s), finger(s), arm(s), etc.

At step 1040, the application 232 determines whether a virtual object associated with an audio event is located proximate to one or more of the hand positions (e.g., positions of the user's hand(s), finger(s), arm(s), etc.). If a virtual object is not located proximate to a hand position, then the method 1000 returns to step 1020, where the application 232 continues to acquire sensor data. If a virtual object is located proximate to a hand position, then the method 1000 proceeds to step 1050, where the application 232 detects whether the user is performing a gesture (e.g., a grasping gesture) based on the hand position(s).

If a gesture is not being performed by the user, then the method 1000 returns to step 1020, where the application 232 continues to acquire sensor data. If a gesture is being performed by the user, then the method 1000 proceeds to step 1060, where the application 232 determines an interaction between the user and the virtual object. For example, and without limitation, the application 232 may continue to acquire sensor data and determine additional hand/arm/finger/etc. positions to determine a position to which the user is moving the virtual object.

Then, at step 1070, the application 232 modifies one or more parameters associated with the audio stream based on the interaction between the user and the virtual object. For example, and without limitation, when a user grasps a virtual object associated with an audio event, the application 232 may dynamically modify spatial audio parameters associated with the audio event, such that the user can hear the audio event being moved from a first location within the sound space to a second location within the sound space. At step 1080, the application 232 causes the display to update the visual representations of one or more audio events based on the interaction between the user and the virtual object, such as by moving a virtual representation from a first display position to a second display position.

Next, at step 1090, the application 232 determines whether the user has completed the gesture (e.g., by releasing the virtual object). If the user has not completed the gesture, then the method 1000 returns to step 1060. If the user has completed the gesture, then the application 232 stops modifying the parameters and visual representation(s) associated with the audio event(s), and the method 1000 ends.

In sum, a visual representation of an audio event is displayed to the user. An application executing on the processing unit then detects a gesture performed by the user via one or more sensors. In response to the gesture, the application modifies one or more parameters associated with an audio stream and updates the position of the visual representation. The gesture system then reproduces the audio stream for the user based on the modified parameters. Additionally, the gesture system may display a three-dimensional visual representation of an audio event and determine an interaction between the user and a virtual object associated with the audio event via a physics model. The three-dimensional visual representation and one or more audio parameters associated with an audio stream may then be modified based on the interaction.

At least one advantage of the techniques described herein is that the user is able to modify the position at which an audio event is being reproduced within a virtual sound space. For instance, a user may interact with a volumetric display to grasp a virtual object associated with the audio event and reposition the virtual object at a desired location within a virtual three-dimensional space. Additionally, visual, auditory, and/or haptic feedback may be provided to the user (e.g., via the volumetric display) when the user interacts with the audio event. Accordingly, audio events may be repositioned within the sound space, enabling the user to more effectively listen to and/or interact with multiple audio events at the same time.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of sensors and algorithms that may acquire and process data associated with a user gesture and/or the user's environment, persons skilled in the art will appreciate that the systems and techniques described herein are applicable to other types of sensors and algorithms. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

What is claimed is:

1. A method for modifying an audio parameter based on a gesture, the method comprising:
    acquiring sensor data associated with a hand of a user;
    analyzing the sensor data to determine at least one hand position;
    displaying a first virtual object that comprises a visual representation of an audio event in a first region of a volumetric display, wherein the volumetric display allows the user to interact with virtual objects associated with different audio events and re-position the virtual objects within a virtual three-dimensional space in order to modify positions at which the different audio events are reproduced within a sound space;
    displaying a notification associated with a second audio event in the first region, wherein the notification overlaps the first virtual object in the first region;
    determining, based on the at least one hand position, an interaction between the first virtual object and a second virtual object that corresponds to the hand of the user;
    in response to the interaction,
        determining that the interaction is associated with the notification;
        determining, based on at least one of a velocity and a duration of the interaction, a first sub-region of the first region of the volumetric display;
        displaying the first virtual object within only the first sub-region of the first region;
        determining a second sub-region of the first region of the volumetric display that is available to display a third virtual object that comprises a visual representation of the second audio event, wherein the second sub-region is independent of the first sub-region; and
        displaying the third virtual object in the second sub-region;
    based on the first sub-region, modifying a spatial audio parameter associated with the audio event to generate a modified audio stream; and
    causing the modified audio stream to be reproduced for output within an audio region of the sound space corresponding to the first sub-region.

2. The method of claim 1, wherein modifying the spatial audio parameter comprises moving the audio event from a third location within a sound space towards a fourth location within the sound space.

3. The method of claim 1, wherein determining the interaction comprises detecting, based on the coordinates associated with the hand of the user, that the second virtual object is proximate to the first virtual object.

4. The method of claim 1, wherein determining the interaction comprises detecting that the second virtual object is proximate to the first virtual object.

5. The method of claim 4, further comprising causing at least one of auditory feedback and haptic feedback to be generated in response to detecting that the second virtual object is proximate to the first virtual object.

6. The method of claim 2, wherein analyzing the sensor data comprises determining a first hand position at which a grasping gesture was initiated, and determining a second hand position at which the grasping gesture was terminated, wherein the first hand position is associated with the third location within the sound space and the second hand position is associated with the fourth location within the sound space.

7. The method of claim 1, wherein the audio event comprises an ambient audio source that spans a portion of the sound space, and the visual representation spans a portion of the display that corresponds to the portion of the sound space.

8. The method of claim 1, further comprising:
    determining, based on the at least one hand position, a second interaction between the first virtual object and the second virtual object;
    based on the second interaction, moving the audio event from a first sound space associated with the user to a second sound space associated with a second user to generate a second modified audio stream; and
    causing the second modified audio stream to be reproduced within the second sound space.

9. A system for modifying an audio parameter based on a gesture, comprising:
    at least one sensor configured to acquire sensor data associated with a hand of a user;
    a processor coupled to the at least one sensor and configured to:
        analyze the sensor data to determine at least one hand position; and
        display a first virtual object that comprises a visual representation of an audio event in a first region of a volumetric display, wherein the volumetric display allows the user to interact with virtual objects associated with different audio events and re-position the virtual objects within a virtual three-dimensional space in order to modify positions at which the different audio events are reproduced within a sound space;
        display a notification associated with a second audio event in the first region, wherein the notification overlaps the first virtual object in the first region;
        determine, based on the at least one hand position, an interaction between the first virtual object and a second virtual object that corresponds to the hand of the user;
        in response to the interaction,
            determine that the interaction is associated with the notification;
            determine, based on at least one of a velocity and a duration of the interaction, a first sub-region of the first region the volumetric display; and
            determine a second sub-region of the first region of the volumetric display that is available to display a third virtual object that comprises a visual representation of the second audio event, wherein the second sub-region is independent of the first sub-region;

based on the sub-region, modify a spatial audio parameter associated with the audio event to generate a modified audio stream; and cause the modified audio stream to be reproduced for output to the user within an audio region of the sound space corresponding to the sub-region; and a display coupled to the processor and configured to:
display a visual representation of the first virtual object in the first region; and
in response to the interaction,
display the visual representation within only the sub-region of the first region; and
display the third virtual object in the second sub-region.

10. The system of claim 9, wherein the processor is configured to modify the spatial audio parameter by moving the audio event from a third location within a sound space towards a fourth location within the sound space.

11. The system of claim 9, wherein the sensor data comprises first coordinates associated with the hand of the user in three-dimensional space, and the processor is configured to determine the interaction by determining that the first coordinates associated with the hand of the user are proximate to second coordinates associated with the second virtual object.

12. The system of claim 9, wherein the processor is configured to determine the interaction by determining that the hand of the user is performing a gesture proximate to the three-dimensional image.

13. The system of claim 9, wherein the at least one hand position comprises first hand positions associated with the user, and second hand positions associated with a second user, and the processor is further configured to:
determine, based on the second hand positions, a second interaction between a third virtual object that corresponds to a second audio event and a fourth virtual object that corresponds to a hand of the second user;
based on the second interaction, moving the second audio event from a second sound space associated with the second user to a first sound space associated with the user.

14. The system of claim 9, wherein the processor is further configured to detect, based on the at least one hand position, that the second virtual object is proximate to the first virtual object and, in response, cause at least one of visual feedback, auditory feedback, and haptic feedback to be generated.

15. The system of claim 9, wherein the audio event comprises an ambient audio source, and the processor is configured to modify the spatial audio parameter by modifying a portion of a sound space that is spanned by the audio event.

16. A non-transitory computer-readable storage medium including instructions that, when executed by a processor, cause the processor to modify an audio parameter based on a gesture, by performing the steps of:
acquiring sensor data associated with a hand of a user;
analyzing the sensor data to determine at least one hand position;
displaying a first virtual object that comprises a visual representation of an audio event in a first region of a volumetric display, wherein the volumetric display allows the user to interact with virtual objects associated with different audio events and re-position the virtual objects within a virtual three-dimensional space in order to modify positions at which the different audio events are reproduced within a sound space;
displaying a notification associated with a second audio event in the first region, wherein the notification overlaps the first virtual object in the first region;
determining, based on the at least one hand position, an interaction between the first virtual object and a second virtual object that corresponds to the hand of the user;
in response to the interaction,
determining that the interaction is associated with the notification;
determining, based on at least one of a velocity and a duration of the interaction, a first sub-region of the first region of the volumetric display;
displaying the first virtual object within only the first sub-region of the first region;
determining a second sub-region of the first region of the volumetric display that is available to display a third virtual object that comprises a visual representation of the second audio event, wherein the second sub-region is independent of the first sub-region; and
displaying the third virtual object in the second sub-region;
based on the first sub-region, modifying a spatial audio parameter associated with the audio event to generate a modified audio stream; and
causing the modified audio stream to be reproduced for output within an audio region of the sound space corresponding to the first sub-region.

17. The method of claim 1, further comprising causing a second audio stream to be reproduced for output within a second audio region of the sound space corresponding to the second sub-region.

18. The method of claim 1, wherein the first region comprises all of a display region of the volumetric display.

* * * * *